United States Patent
Lai et al.

(10) Patent No.: US 11,699,816 B1
(45) Date of Patent: Jul. 11, 2023

(54) RECHARGEABLE BATTERY

(71) Applicant: Shenzhen Hotchip Technology Co., Ltd., Shenzhen (CN)

(72) Inventors: Zelian Lai, Shenzhen (CN); Quan Jiang, Shenzhen (CN)

(73) Assignee: Shenzhen Hotchip Technology Co., Ltd., Shenzhen (CN)

( * ) Notice: Subject to any disclaimer, the term of this patent is extended or adjusted under 35 U.S.C. 154(b) by 0 days.

(21) Appl. No.: 18/151,418

(22) Filed: Jan. 6, 2023

(30) Foreign Application Priority Data

Dec. 14, 2022 (CN) .......................... 202223369613.1

(51) Int. Cl.
*H01M 10/42* (2006.01)
*H01R 24/60* (2011.01)
*H01M 50/271* (2021.01)
*H01M 50/244* (2021.01)
*H01M 10/0525* (2010.01)

(52) U.S. Cl.
CPC ..... *H01M 10/425* (2013.01); *H01M 10/0525* (2013.01); *H01M 50/244* (2021.01); *H01M 50/271* (2021.01); *H01R 24/60* (2013.01)

(58) Field of Classification Search
None
See application file for complete search history.

(56) References Cited

U.S. PATENT DOCUMENTS

2011/0104522 A1* 5/2011 Morita ................ H01M 50/213
429/7
2020/0161713 A1* 5/2020 Qin ..................... H01M 50/152

FOREIGN PATENT DOCUMENTS

| CN | 105304954 A | 2/2016 |
| CN | 206041532 U | 3/2017 |
| CN | 206834281 U | 1/2018 |

* cited by examiner

*Primary Examiner* — Wyatt P McConnell
(74) *Attorney, Agent, or Firm* — Nitin Kaushik

(57) ABSTRACT

The utility model discloses a rechargeable battery including a cover and a main body, the main body being connected to the cover on which a negative end is disposed, and the body being provided with a positive end; the main body including an interface, a first housing and a second housing, the first housing being connected to the second housing, and the interface being connected to the first housing, wherein the first housing and the second housing are buckled to form an accommodating space, and the interface which is a male connector outwards extends from the inside of the accommodating space. The negative electrode of the rechargeable battery is provided with the cover; a user can perform charging via the interface by opening the cover to expose the interface disposed therein; and the interface is the male connector which can be directly plugged in an electronic product with a receptacle.

7 Claims, 5 Drawing Sheets

RECHARGEABLE BATTERY

CROSS-REFERENCE TO RELATED APPLICATIONS

The application claims priority to Chinese patent application No. 202223369613.1, filed on Dec. 14, 2022, the entire contents of which are incorporated herein by reference.

TECHNICAL FIELD

The utility model relates to the technical field of batteries, in particular to a rechargeable battery.

BACKGROUND

With the continuous development of electronic supplies for daily life, a dry battery used as a conventional consumable is being more and more widely installed and used in lives of residents. Generally, a used-up dry battery will be discarded and is non-reusable. At present, there are also parts of rechargeable AA batteries or AAA batteries such as nickel-cadmium batteries and nickel-hydrogen batteries in the market, however, such batteries require a dedicated charger, and most of them are inconvenient to carry. In addition, a working voltage of each of the nickel-cadmium batteries and nickel-hydrogen batteries is 1.2V which is incapable of adapting to an electric appliance requiring a higher voltage.

Therefore, a solution in which a rechargeable battery is adopted appears in the market to overcome the above-mentioned defects of the battery. However, an interface of the rechargeable battery in the market is generally set as a receptacle, and thus, a user has to always carry a data line with the corresponding interface, which brings inconvenience for a trip.

SUMMARY

The technical problem to be solved in an embodiment of the utility model is that an interface of a rechargeable battery in the market is generally set as a receptacle, and thus, a user has to always carry a data line with the corresponding interface, which brings inconvenience for a trip.

In order to solve the above-mentioned problem, the utility model provides a rechargeable battery.

The utility model discloses a rechargeable battery including a cover and a main body, the main body being connected to the cover on which a negative end is disposed, and the main body being provided with a positive end;

the main body comprising an interface, a first housing and a second housing, the first housing being connected to the second housing, and the interface being connected to the first housing;

wherein the first housing and the second housing are buckled to form an accommodating space, and the interface which is a male connector outwards extends from the inside of the accommodating space.

Preferably, the cover is provided with contact terminals, and the contact terminals are connected to the negative end and the interface.

Preferably, the main body comprises a battery cell and a power control module, and the power control module is connected to the battery cell; and the battery cell is disposed inside the second housing, the positive end is connected to the battery cell, and the power control module is connected to the interface.

Preferably, the battery cell is a lithium battery cell.

Preferably, the interface is a Type-C port.

Preferably, the cover comprises a cover body, the cover body is provided with openings, the negative end is provided with clamping parts corresponding to the openings and plugged in the openings, and the position where plug holes are disposed is matched with the position of the interface.

Preferably, the first housing is provided with an open slot, and the interface passes through the position of the open slot.

Compared with the prior art, the embodiment of the utility model can achieve the technical effects:

the negative electrode of the rechargeable battery is provided with the cover; a user can perform charging via the interface by opening the cover to expose the interface disposed therein; and the interface is the male connector which can be directly plugged in an electronic product with a receptacle, such as a recharger, a mobile phone, a tablet computer and a computer to perform charging, and thus, it is unnecessary for the user to connect the battery to two ends of a charging device by using a data line. Furthermore, the negative end of the rechargeable battery is disposed on the cover, the rechargeable battery can supply power to an installed product by buckling the cover on the main body, and thus, the use convenience of the rechargeable battery can be improved.

Figure 1:
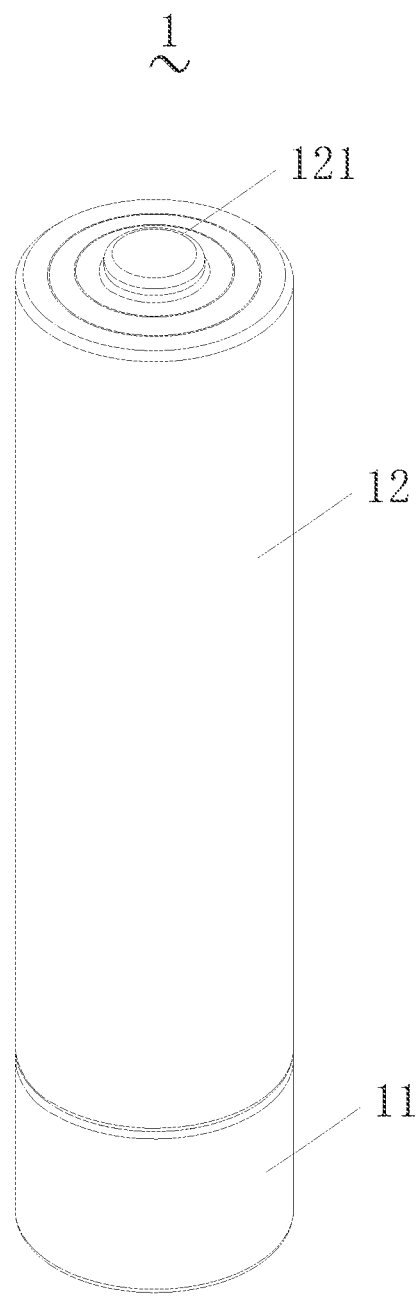
FIG. 1 is a first schematic structural diagram of a rechargeable battery provided by the utility model.
Figure 2:
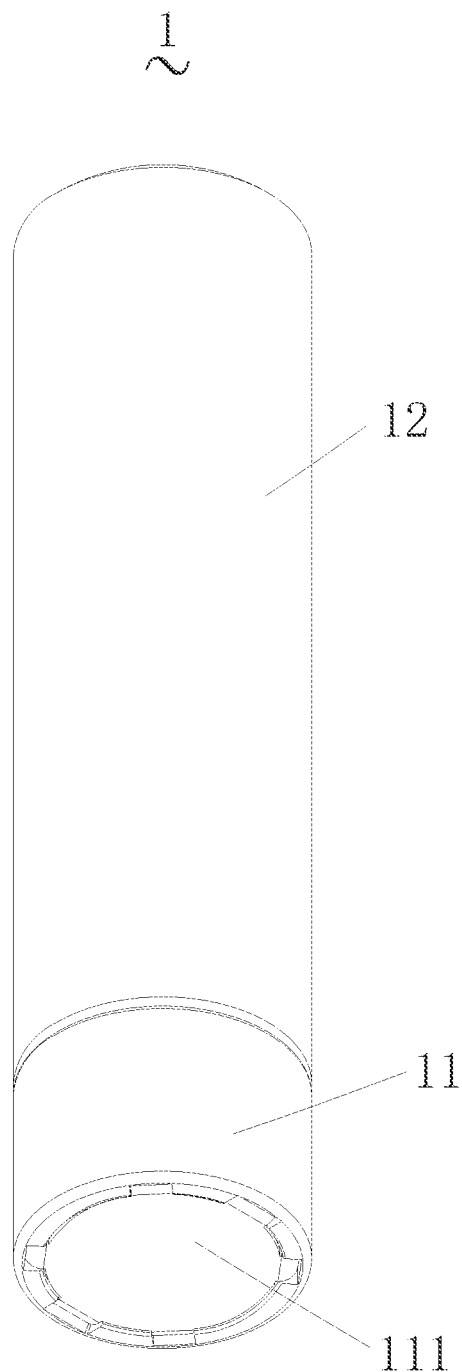
FIG. 2 is a second schematic structural diagram of the rechargeable battery provided by the utility model.
Figure 3:
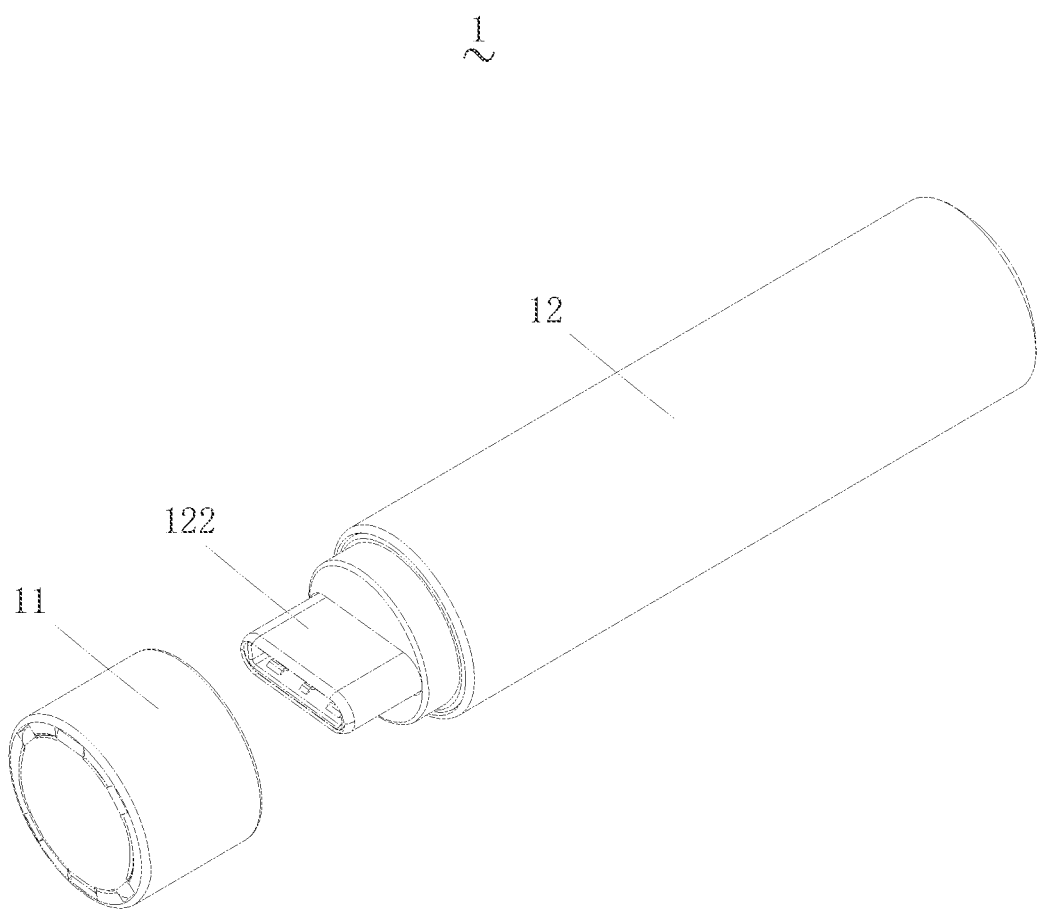
FIG. 3 is a diagram showing a use state of the rechargeable battery provided by the utility model.

Reference numerals in the accompanying drawings:

1, rechargeable battery;

11, cover; 111, negative end; 1111, clamping part; 112, cover body; 1121, plug hole; 1122, opening; 113, contact terminal;

12, main body; 121, positive end; 122, interface; 123, first housing; 1231, open slot; 124, second housing; 125, battery cell; and 126, power control module.

DETAILED DESCRIPTION OF THE EMBODIMENTS

Figure 4:
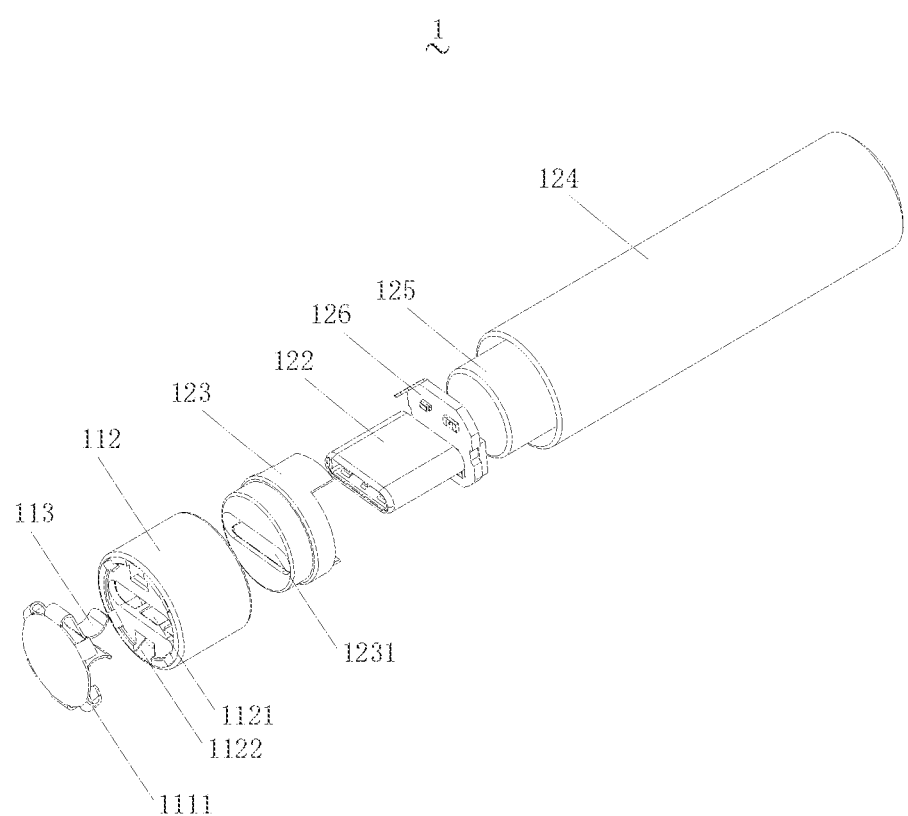
FIG. 4 is a first schematic diagram showing an exploded structure of the rechargeable battery provided by the utility model.

Referring to FIG. 1 to F FIG. 4, the utility model discloses a rechargeable battery 1 including a cover 11 and a main body 12, wherein the main body 12 is connected to the cover on which a negative end 11 is disposed, and the main body 12 is provided with a positive end 121.

It can be understood that, when the battery is in a state that the cover 11 covers the main body 12, one end of the cover 11 is a negative end 111, and one ned of the main body 12 is a positive end 121; and when the battery is installed, in a way of positive and negative electrode correspondence, on a product required to be powered, the negative end 111 corresponds to a negative interface 122 of the product required to be powered, the negative end 121 corresponds to a positive interface 122 of the product required to be powered, and thus, the product required to be powered is normally powered.

The main body 12 includes an interface 122, a first housing 123 and a second housing 124, the first housing 123 is connected to the second housing 124, the interface 122 is connected to the first housing 123, the first housing 123 and the second housing 124 are buckled to form an accommodating space, and the interface 122 which is a male connector outwards extends from the inside of the accommodating space.

Specifically, the cover 11 can be separated from the main body 12, the main body 12 is provided with the interface 122 for charging, the battery can be charged by plugging the rechargeable battery 1 of which the cover 11 is removed in a receptacle with the corresponding interface 122 in the battery, and thus, the use convenience of the battery can be improved.

It can be understood that the situation that the power of the battery runs out may appear when a user uses a portable product such as a fan, an alarm clock, a mouse and an electronic cigarette, and the rechargeable battery 1 can be recharged and then further used. The negative electrode of the rechargeable battery 1 is provided with the cover 11; the user can perform charging via the interface 122 by opening the cover 11 to expose the interface 122 disposed therein; and the interface 122 is the male connector which can be directly plugged in an electronic product with a receptacle, such as a recharger, a mobile phone, a tablet computer and a computer to perform charging, and thus, it is unnecessary for the user to connect the battery to two ends of a charging device by using a data line. Furthermore, the negative end 111 of the rechargeable battery 1 is disposed on the cover 11, the rechargeable battery 1 can supply power to an installed product by buckling the cover 11 on the main body 12, and thus, the use convenience of the rechargeable battery 1 is improved.

When the rechargeable battery 1 is placed in a carry-on article such as a portable fan and an electronic cigarette to supply power. When the rechargeable battery 1 is underpowered during the trip of the user, the user can remove the rechargeable battery 1 and plug the interface 122 in a carry-on portable charger or mobile phone for charging, so that the situation that the user carries a data line with the corresponding interface is reduced, and the use convenience of the product is improved.

Optionally, the interface 122 is a Type-C port or may adopt a lightning interface 122 and is adaptable to a product with a different interface 122, so that the battery can be charged by more products.

The cover 11 includes a cover body 112 and contact terminals 113, the contact terminals 113 are connected to the negative end 111 and are linked to the interface 122, the cover body 112 is provided with plug holes 1121 and openings 1122, the negative end 111 is provided with clamping parts 1111 corresponding to the openings 1122 and plugged in the openings 1122, and the position where the plug holes 1121 are disposed is matched with the position of the interface 122.

Specifically, the cover 11 is buckled on the main body 12, the interface 122 is plugged into the cover body 112 and is correspondingly plugged into the plug holes 1121 of the cover body 112, and meanwhile, the contact terminals 113 abut against the surface of the interface 122; after the cover 11 is separated from the main body 12, the contact terminals 13 may be separated from the interface 122, and thus, the electric connection relationship is invalid; and after the cover 11 is combined with the main body 12, the contact terminals 113 abut against the surface of the interface 122 again. It can be understood that the contact terminals 113 are in contact with the interface 122 so that the cover 11 is recombined after being separated from the main body 12, and an electric connection structure of the both is still kept stable. Furthermore, the number of the openings 1122 is equal to the number of the contact terminals 113 and the clamping parts 1111, the clamping parts 1111 are clamped in the openings 1122 in the cover body 112, the contact terminals 113 penetrate into the cover body 112 via the openings 1122, one end of each of the contact terminals 113 abuts against the interface 122, and the clamping parts 1111 can clamp the negative end 111 on the cover body 112 to prevent the negative end 111 from falling off, thereby guaranteeing the stability thereof.

The main body 12 includes a battery cell 125 and a power control module 126, and the power control module 126 is connected to the battery cell 125; the battery cell 125 is disposed inside the second housing 124, the positive end 121 is connected to the battery cell 125, and the power control module 126 is connected to the interface 122; the battery cell 125 is capable of storing electric energy and supplying the electric energy to the product required to be powered; and the power control module 126 is linked to the positive end 121 and the negative end 111 and is capable of charging the battery cell 125 or outwards outputting the electric energy of the battery cell 125. Furthermore, the first housing 123 is provided with an open slot 1231, and the interface 122 passes through the open slot 1231.

Specifically, firstly, the battery cell 125 is loaded into the second housing 124; then, the power control module 126 is loaded in the second housing 124, and the interface 122 is disposed on the surface, facing away from the battery cell 125, of the power control module 126; finally, the first housing 123 is buckled on the second housing 124; and the interface 122 outwards extends from the open slot 1231 in the first housing 123 and is capable of charging the battery cell 125.

Particularly, the battery cell 125 is a lithium battery cell.

Optionally, the power control module 126 is internally provided with a circuit for overcharge, over discharge, overload, over-temperature and short circuit protection, etc., which can play a role in protecting the battery to prevent the battery from being damaged and prolong the service life.

Figure 5:
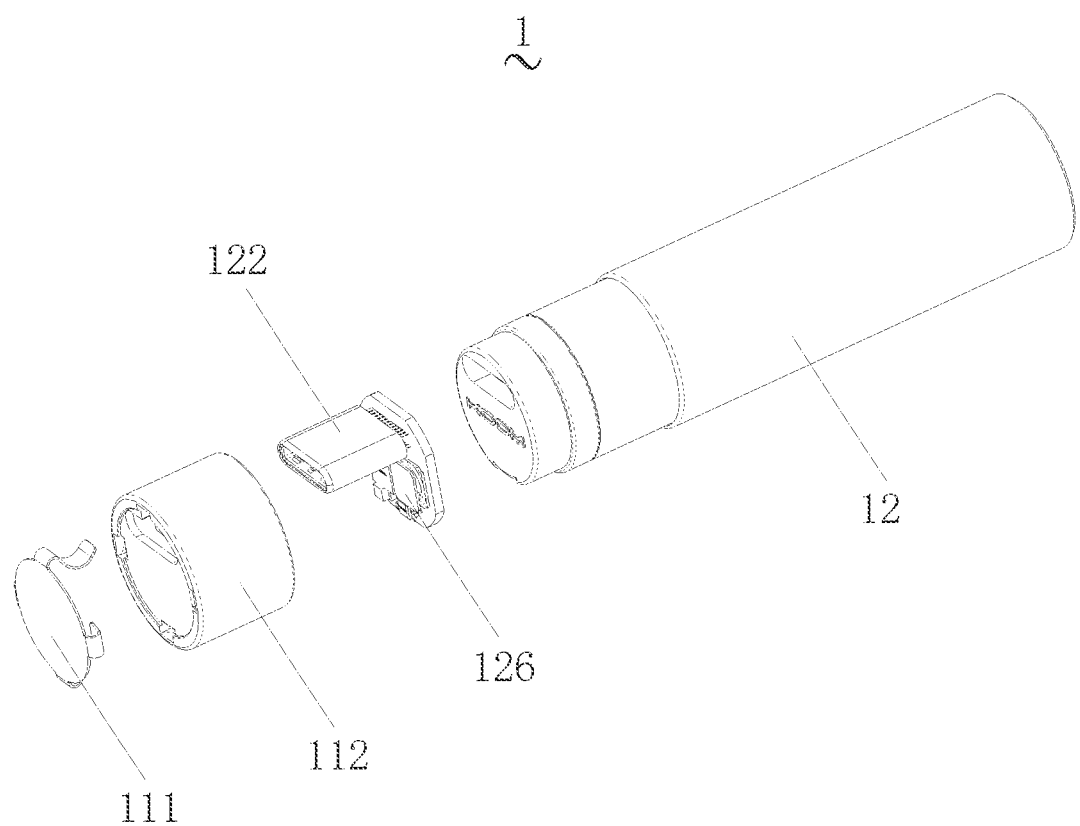
FIG. 5 is a second schematic diagram showing the exploded structure of the rechargeable battery provided by the utility model.

Furthermore, the rechargeable battery 1 provided in the utility model is an AA battery or an AAA battery. In the present embodiment, the structure of the AAA battery is specifically described, but is not limited to the structure in the present embodiment, and the structure in the present embodiment is also applicable to the AA battery (as shown in FIG. 5).

In the above-mentioned embodiments, each embodiment has its own emphasis in the description, and parts which are not described in detail in a certain embodiment may refer to the relevant descriptions in other embodiments.

In the description of the utility model, it should be understood that directional or positional relationships indicated by terms such as "center", "longitudinal", "transverse", "length", "width", "thickness", "upper", "lower", "front", "rear", "left", "right", "vertical", "horizontal", "top", "bottom", "inner", "outer", "clockwise" and "anti-clockwise" are based on directional or positional relationships as shown in the accompanying drawings, and are only for the purposes of facilitating describing the utility model and simplifying the description, rather than indicating or implying that the referred apparatus or element has to have a specific direction or be constructed and operated in the specific direction, and therefore, they cannot be regarded as limitations on the utility model.

Furthermore, terms such as "first" and "second" are only for descriptive purposes, and cannot be understood as indicating or implying the relative importance or implicitly indicating the number of indicated technical features. Therefore, the features defined as "first" and "second" may explicitly or implicitly include at least one of the features. In the description of the utility model, "a plurality of" means two or more unless it may be specifically defined otherwise.

In the utility model, the terms "installed", "connected", "connection" and "fixed" should he understood in a broad sense unless otherwise specified and defined, for example, "connection" may be fixed connection or detachable connection or integrated connection, may be mechanical connection or electrical connection, may be direct connection or indirect connection through an intermediate medium, and may be internal connection of two elements or interaction between the two elements. For those of ordinary skill in the art, the specific meanings of the above-mentioned terms in the utility model may be understood according to specific situations.

What is claimed is:

1. A rechargeable battery, comprising a cover and a main body, the main body being connected to the cover on which a negative end is disposed, and the main body being provided with a positive end;
   the main body comprising an interface, a first housing and a second housing, the first housing being connected to the second housing, and the interface being connected to the first housing;
   wherein the first housing and the second housing are buckled to form an accommodating space, and the interface which is a male connector outwards extends from the inside of the accommodating space.

2. The rechargeable battery of claim 1, wherein the cover is provided with contact terminals, and the contact terminals are connected to the negative end and the interface.

3. The rechargeable battery of claim 1, wherein the main body comprises a battery cell and a power control module, and the power control module is connected to the battery cell; and
   the battery cell is disposed inside the second housing, the positive end is connected to the battery cell, and the power control module is connected to the interface.

4. The rechargeable battery of claim 1, wherein the battery cell is a lithium battery cell.

5. The rechargeable battery of claim 1, wherein the interface is a Type-C port.

6. The rechargeable battery of claim 1, wherein the cover comprises a cover body, the cover body is provided with openings, the negative end is provided with clamping parts corresponding to the openings and plugged in the openings, and the position where plug holes are disposed is matched with the position of the interface.

7. The rechargeable battery of claim 1, wherein the first housing is provided with an open slot, and the interface passes through the position of the open slot.

* * * * *